(12) United States Patent
Yang

(10) Patent No.: US 7,714,064 B2
(45) Date of Patent: May 11, 2010

(54) CONTROLLABLE AND RAPID SOLUBILITY RATE OF WATER-SOLUBLE POLYMERIC FILMS

(76) Inventor: Thomas P. Yang, 1138 W. 49th Avenue, Vancouver, BC (CA) V6M 2P8

( * ) Notice: Subject to any disclaimer, the term of this patent is extended or adjusted under 35 U.S.C. 154(b) by 19 days.

(21) Appl. No.: 11/957,368

(22) Filed: Dec. 14, 2007

(65) Prior Publication Data

US 2008/0097029 A1 Apr. 24, 2008

Related U.S. Application Data

(63) Continuation of application No. 10/798,295, filed on Mar. 12, 2004, now abandoned.

(30) Foreign Application Priority Data

Apr. 9, 2003 (CN) ................................ 03 1 09627

(51) Int. Cl.
*C08L 25/18* (2006.01)
*C08F 16/06* (2006.01)
*C08J 5/18* (2006.01)

(52) U.S. Cl. ............................. 525/56; 525/57; 525/58; 525/212

(58) Field of Classification Search .................... 525/56, 525/57, 58, 212
See application file for complete search history.

(56) References Cited

U.S. PATENT DOCUMENTS

| | | | |
|---|---|---|---|
| 2,948,697 A | 8/1960 | Robertson | |
| 3,106,543 A | 10/1963 | Milne | |
| 3,157,611 A | 11/1964 | Lindemann | |
| 3,387,405 A | 6/1968 | Iwasyk et al. | |
| 3,505,303 A | 4/1970 | Lindemann | |
| 3,677,979 A * | 7/1972 | Beaulieu | 521/28 |
| 3,833,457 A * | 9/1974 | Misumi et al. | 428/457 |
| 4,196,001 A * | 4/1980 | Joseph et al. | 430/502 |
| 4,618,655 A * | 10/1986 | Dehm et al. | 525/344 |
| 5,096,975 A * | 3/1992 | Anderson et al. | 525/328.5 |
| 5,807,919 A * | 9/1998 | Duan et al. | 524/501 |
| 6,071,618 A | 6/2000 | Cook, Jr. et al. | |
| 2002/0161088 A1 * | 10/2002 | Kochvar et al. | 524/379 |

OTHER PUBLICATIONS

Hawley's Condensed Chemical Dictionary, 11 th Ed, p. 1111-1112,(1987).*
Hawley's Condensed Chemical Dictionary, 11th Ed, p. 1111-1112, 1987.

* cited by examiner

*Primary Examiner*—Kelechi C Egwim
(74) *Attorney, Agent, or Firm*—Oyen Wiggs Green & Mutala LLP

(57) ABSTRACT

Water-soluble films are prepared from polymer blends of polyvinyl alcohol and sulfonate polymers. The sulfo group can be acid form, $SO_3H$, as well as salt form of potassium, sodium, ammonium, i.e. $-SO_3K$, $-SO_3Na$, and $-SO_3NH_4$. Conventional film-forming processes can be used to produce the films. Polymeric films prepared from the blend compositions have unique characteristics. Their water solubility rate can be controlled by varying the composition ratio of the polymer blend. Their water solubility rate is increased even at a temperature of 0° C. The water-soluble polymeric films can be used as packaging materials and immersion transfer printing film.

15 Claims, No Drawings

CONTROLLABLE AND RAPID SOLUBILITY RATE OF WATER-SOLUBLE POLYMERIC FILMS

CROSS-REFERENCE TO RELATED APPLICATION

This application is a continuation of application Ser. No. 10/798,295, filed Mar. 12, 2004, which is incorporated by reference.

FIELD OF THE INVENTION

This invention relates to compositions of polymer blends useful for preparing films by conventional industrial film processes, and particularly to water-soluble and heat-sealable films having a controlled water-solubility rate.

BACKGROUND OF THE INVENTION

Considerable interest has been shown recently in the use of polyvinyl alcohol water-soluble films for packaging and bags. Such products have a number of uses. Packaging materials contaminated by toxic or harmful materials such as biocides, preservatives, bleach, fertilizers and detergents, must be disposed in an environmentally safe way. Under increasing pressure of environmental regulation, it is often difficult and expensive to dispose of empty packages or bags which contain residues of toxic or harmful materials. It is highly desirable for the safety of the user of such toxic or harmful materials to use water-soluble polymer films as packaging films. Most of these chemicals are in powder or dust form and a user may breathe or be exposed to them. To protect a user from these chemicals, water-soluble bags can be used. When the chemical product is needed, the package is immersed in water and the package dissolves in water with its content. Airborne contamination is therefore eliminated.

For convenience of use and to reduce handling, many chemical products are packaged in unit containers or bags having a pre-determined quantity. For example, products such as dyes, detergents and cement are packaged in unit containers or bags. The use of such containers or bags permits measured amounts of the packaged chemicals to be used without handling the chemicals directly, protecting users from being exposed to the chemicals. Water-soluble films are suitable materials to prepare such unit containers or bags. When the chemical product is needed, the container or bag is immersed in water and the bag and its content dissolves in water.

In the healthcare field, articles such as bedclothes from hospitals, particularly from infectious disease hospitals, have to be sterilized for reuse. It is important to protect workers from contact and exposure to the used articles. Bags prepared from water-soluble films can be used as a container and put into a sterilizer directly without opening, to eliminate contact with infectious disease bacteria.

Water-soluble bags prepared from polymeric films are particularly useful where the contents are toxic or should for other reasons not be touched.

Water-soluble films are also widely used in immersion printing processes. These are processes for decorating products with complex curving surfaces. Water-soluble films can suitably be used as carriers of immersion printing plates. In immersion printing processes, controlled water-solubility rate and stiffness are both very important to the films floated on the water surface.

Many techniques have been investigated to modify polyvinyl alcohol to increase the water-solubility rate of films prepared therefrom. They can be summarized as following: (1) degradation of the polymer; (2) design of film structure; (3) new copolymers of polyvinyl alcohol; and (4) modifications of polyvinyl alcohol.

U.S. Pat. No. 6,071,618 (Cook, Jr. et al.) discloses a process for increasing the solubility rate of a water soluble polyvinyl alcohol film. A polymeric film comprises at least one irradiated water soluble layer. In the irradiation process, the film is subjected to an energetic radiation treatment, such as corona discharge, plasma, flame, ultraviolet, X-ray, gamma ray, beta ray, and high energy electron treatment. The molecular weight of the polymer is decreased by the degradation of the polymer through the irradiation process to increase the solubility rate of the polymer. The molecular weight of the polymer is increased by crosslinking of the polymer through the irradiation process to decrease the solubility rate of the polymer. The irradiation equipment and process are very expensive. The patent indicates that the water-solubility rate of the films at 0° C. can be increased.

U.S. Pat. No. 3,387,405 (Iwasyk et al.) discloses a foam structure film of polyvinyl alcohol. A polyvinyl alcohol solution containing gelling agents is mixed with bubbles of air under pressure. The foam is dried to a cellular film to improve the water solubility rate. It is a slow process and difficult to control the gelling conditions.

U.S. Pat. No. 3,157,611 (Lindemann) discloses a polyvinyl alcohol film plasticized by phosphate ester to improve the cold water solubility rate. It also indicates that many plasticizers such as glycerin, ethylene glycol, ethanol acetamide and ethanol formamide have been suggested for polyvinyl alcohol in order to produce a material readily dissolved in water but that they are not effective in producing polymeric materials with improved cold water solubility. The plasticizers disclosed in this patent have the following disadvantages: they are humectants which absorb moisture in high humidity conditions to make them become tacky and weak; or they are volatile so that they are easy to migrate to their surface. All these disadvantages will affect the water solubility rate and other physical properties of the film. The fact that phosphate esters are not highly compatible with polyvinyl alcohol results in the former tending to migrate to the surface of the latter.

U.S. Pat. No. 2,948,697 (Robertson) discloses that polyvinyl alcohol films plasticized by combination of polypropylene glycol and phosphate esters are improved in their water solubility rates both at high and low temperatures. But they still suffer two problems, namely poor compatibility between polyvinyl alcohol and plasticizers, and the migration of plasticizers to the surface of the films.

U.S. Pat. No. 3,106,543 (Milne) discloses a polyvinyl alcohol modification method: an ethylene oxide is reacted with aqueous polyvinyl alcohol solution to obtain a hydroxyethylated polyvinyl alcohol. The films prepared from the modified polyvinyl alcohol do not contain any plasticizers. Because the process must be carried out in extremely dilute aqueous polyvinyl alcohol solution in an autoclave, it is expensive.

U.S. Pat. No. 3,505,303 (Lindemann) discloses a film made of modified polyvinyl alcohols, which is clear, colorless and readily soluble in cold water. The patent indicates that the solubility of a film can be raised by modifying polyvinyl alcohol through copolymerization, but the solubility of a film in cold water is not increased. The films disclosed have high solubility in cold water. Under alkaline condition, acryl amide is added to some of the hydroxyl groups of the polyvinyl alcohol molecules by an alkene addition reaction.

Because the concentration of the polyvinyl alcohol solution is 10-20%, the process is expensive. In addition, the acryl amides must be recovered.

It would be desirable to provide water-soluble films' having the characteristics of controllable solubility rate and rapid cold water solubility, even at 0° C.

SUMMARY OF THE INVENTION

According to one broad aspect of the invention, there is provided a water-soluble film comprising a blend of polyvinyl alcohol and a polymer containing a sulfonate monomer. According to another broad aspect of the invention, there is provided a composition comprising such blend for use in forming water-soluble films.

The invention provides controllable and rapid solubility rate of water-soluble polymeric films. The solubility rate of the polymeric films of the novel polymer blends is controlled by varying the weight percent of the sulfo-containing polymer in the composition of the polymer blend. The higher the weight percent of the sulfo-containing polymer in the composition of the polymer blend, the more rapid the solubility of the polymeric film. The solubility rate is increased at high or low temperatures, even at 0° C.

When the polymeric films of the present invention are immersed in water or floated on the surface of water, their water solubility can be controlled at a desired rate. The polymeric films can be used for packaging films and as a base materials of an immersion transfer printing film.

DETAILED DESCRIPTION OF THE PREFERRED EMBODIMENTS

The present invention provides polymer blend compositions of polyvinyl alcohol and sulfonate polymers. The polymeric films prepared from novel compositions of the invention can be obtained by conventional industrial processes for film forming.

In this specification, the term "sulfo group" means the functional group of sulfonic acid in the form of free acid or its salts, i.e. $-SO_3M$, where M is H or a cation. The term "sulfonate monomer" means a monomer containing a sulfo group. The term "sulfonate polymer" means a polymer containing a sulfonate monomer. Thus, the sulfonate polymers of the invention are polymers containing a sulfo group.

It is important that the sulfonate polymers be water soluble. Accordingly, polymers with sulfo groups in the form of salts which render the polymers water insoluble, or minimally soluble, are not suitable for use in the invention. Preferably, the sulfonate polymers have sulfo groups in the form of the free acid or the sodium, potassium or ammonium salt, all of which are water soluble. The lithium salt is also useful, but is not preferred due to the higher cost of lithium salts. "Water soluble" in this specification means that the sulfonate polymer is readily soluble in water to an extent such that films comprising the polymer blend compositions of the invention are commercially-practical water-soluble films.

As used in this application, the term "polymers" is used generically, unless otherwise indicated, to mean homopolymers, copolymers, terpolymers, tetrapolymers, etc., and thus includes polymers prepared using any number of monomers. The term "copolymer" is used generically, unless otherwise indicated, to mean polymers prepared using more than one different monomers. The term "terpolymer" is used generically, unless otherwise indicated, to mean polymers prepared using three different monomers. The term "tetrapolymer" is used generically, unless otherwise indicated, to mean polymers prepared using four different monomers.

The sulfonate polymers can include polymers formed by the free-radical homo-polymerization or free-radical copolymerization of sulfonate monomers. Non-limiting examples of suitable sulfonate monomers include ones from the following compounds: 2-chloroethylene sulfonic acid, ethylenesulfonic acid, ethylenedisulfonic acid, 1-nitriloethylenesulfonic acid, 2-formylethylenesulfonic acid; 1-carboxyethylenesulfonic acid; 1-propene-1-sulfonic acid; 1-propene-2-sulfonic acid; 2-formyl-1-methylethylene sulfonic acid; 1-carboxy-2-methylethylene sulfonic acid; 2-methyl-1,3-propenedisulfonic acid; 1-butene-1-sulfonic acid; 1-carboxy-2,2-dimethyl-ethylene sulfonic acid; 1-pentene-1-sulfonic acid; 1-hexene-1-sulfonic acid; 2-(p-nitrophenyl)ethylene sulfonic acid; 2-phenylethylene sulfonic acid; 2-(p-hydroxyphenyl)ethylene sulfonic acid; 2-(2-aminophenyl)ethylene sulfonic acid; 1-methyl-2-phenylethylene sulfonic acid; 2-(p-methoxyphenyl)ethylene sulfonic acid; 4-phenyl-1,3-butadiene sulfonic acid; 2-(p-acetamidophenyl)ethylene sulfonic acid; 3-chloroallyl solfonic acid; allyl sulfonic acid; 1-hydroxyallyl sulfonic acid; 2-cynoallyl sulfonic acid; 3-chloromethallyl sulfonic acid; 1-carboxyallyl sulfonic acid; 3-carboxyallyl sulfonic acid; methallyl sulfonic acid; 2-methylene-4,4-dimethyl-1,3-disulfo-pentene; 4-methylene-4,4-dimethyl pentene sulfonic acid; 1-hydroxy-3-phenylallyl sulfonic acid; 3-phenylallyl sulfonic acid; 2-benzylallyl sulfonic acid; 2-(p-methylphenoxy)allyl-sulfonic acid; 3-phenoxymethallyl sulfonic acid; 2-sulfoethyl acrylate; 2-sulfoethyl maleate; 3-sulfopropyl acrylate; 2-sulfonyl methacrylate; 3-sulfopropyl acrylate; 2-sulfo-1-(sulfomethyl)ethyl methacrylate; 3-sulfopropyl maleate; 4-sulfobutyl methacrylate; 2-(acyloxymethyl)-c-sulfuran; bis-2-sulfoethyl fumarate; 3-sulfopropyl itaconate; p-sulfophenyl acrylate; 2-(2-methylacryloxymethyl)-sulfofuran; bis(2-sulfoethyl)itaconate; p-sulfophenyl methacrylate; bis(3-sulfopropyl)maleate; bis(3-sulfopropyl) fumarate; bis(2-sulfopropyl)maleate; bis(2-sulfopropyl)fumarate; 5-methyl-2-(methallyloxy)benzene sulfonic acid; bis(2-sulfopropyl)itaconate; ar-(2-acryloyloxyethoxy)-2-naphthalene sulfonic acid; ar-(2-methacryloyloxyethoxy)-naphthalene sulfonic acid; dodecyl-4-sulfopropyl itaconate; dodecyl-4-sulfobutyl itaconate; n-acryloyl taurine; allylthioethyl sulfonic acid; alloxy propene sulfonic acid; n-allyl-n-methylaminoethane-sulfonic acid; n-(methacrylamidomethyl)-sulfoacetamide; vinyloxybenzene sulfonic acid; n-(p-sulfophenyl)methacrylamide; p-[(2-vinylsulfonyl)ethoxy]-benzene sulfonic acid; n-methyl-n-(2-vinylsulfonyl-ethyl)-p-(sodiumsulfo) benzyl amine; dichlorostyrene sulfonic acid; 2-chlorostyrene sulfonic acid; p-styrene sulfonic acid; p-sulfonic acid; vinyltoluene sulfonic acid; 2-methyl styrene sulfonic acid; the potassium, sodium and ammonium salts of each of the foregoing compounds; 4-methylene-2,2,6,6-tetramethyl-3,5-disulfoheptene; allyloxyethyl sulfonic acid; allyl oxybenzene sulfonic acid; and styrene sulfonic acid.

The sulfonate polymers of the invention can be obtained by the free-radical copolymerization of a sulfonate monomer and an olefinic co-monomer. Non-limiting examples of suitable olefinic co-monomers include ones from the following compounds and groups: acrylic acid and its salt; methylacrylic acid and its salt; acrylates; methacrylates; acrylamide; methylacrylamide; vinyl acetate; n-vinyl pyrrolidon; styrene; vinyl chloride; acrylonitrile; and allyl.

Free radical initiators that may be used include 2,2'-azobisisobutyronitrile, acetyl peroxide, benzoyl peroxide, t-butyl peroxide, cumyl peroxide, t-butylhydro peroxide, cumylhydro peroxide, hydrogenperoxide-ferrous sulfate.

The sulfonate polymers can be prepared by any conventional free radical polymerization technique, such as solution polymerization, suspension polymerization, emulsion polymerization and bulk polymerization.

The sulfonate polymers may also be formed by the condensation polymerization of formaldehyde with sulfonate monomers, including sulfonate monomers of the following compounds: aminotoluene sulfonic acid; aminophenol sulfonic acid; 2-amino-4-chloro-phenyl sulfonic acid; 2-amino-1-naphalene sulfonic acid; 1-amino-8-naphthol-3,5 disulfonic acid; amino-naphalene trisulfonic acid; aminobenzene-2,5 disulfonic acid; diaminostilbene sulfonic acid; phenol sulfonic acid; amino-naphthol disulfonic acid; and aminodiphenylamine methane sulfonic acid.

The sulfonate polymers may also be formed by direct sulfonation or alkyl-sulfonation of the polymers. Sulfonation and alkyl-sulfonation reagents include sulfur trioxide and its complex, sulfuric or chlorosulfonic acid, sultone and acetyl sulfate.

The sulfonate polymers can include sulfonated polystyrene, sulfonated polysulfone, sulfonated melamine-formaldehyde resin, sulfonated phenol-formaldehyde resin, sulfonated urea-formaldehyde resin, sulfonated naphthalene-formaldehyde resin, sulfonated ethyl cellulose, sulfonated polyurethane, sulfonated polypropylene glycol, and sulfonated polyethylene glycol.

The number average molecular weight of the sulfonate polymers of the invention is in the range of about 18,000-26,000, preferably 19,000-23,000. The number average molecular weight of the polyvinyl alcohol used for present invention is in the range of about 7,000-13,000, preferably 8,000-11,000.

The polymer blends of the present invention preferably contain sulfonate polymers in the range of about 0.01-60% by weight of the blend, more preferably 0.1-50% by weight, more preferably 1-45% by weight, and most preferably 1-40% by weight. Said blends can be prepared by any conventional industrial process for preparing polymer blends, of which a mixing process is preferred.

The polymeric films prepared from the blends may include conventional film forming additives, including wetting agents, fillers, plasticizers, antioxidants, mold releasing agents, biocides, anti-blocking agents, defoamers, lubricants, etc. Depending on the compositions of the blends, the quantity of the additives is typically 0.1-18 weight %.

The polymeric films can be prepared by any conventional film process, of which solution casting, melt extrusion and blown film processes are more preferred.

The water solubility rate of the polymeric films can be controlled by varying the compositions of the polymer blend. The water solubility rate of the films depends directly on the weight percent of the sulfonate polymers in the blends. The weight percent of the sulfonate polymers in the blends controls the water solubility rate of the films. The water solubility rate of the polymeric films prepared from the novel polymer blends can be increased to 2.4 times of that of a polyvinyl alcohol film at the temperature of 0° C.

In the following examples, the polyvinyl alcohol used has a number average molecular weight of 7,000-13,000; and the poly sodium styrene sulfonate used has a number average molecular weight of 18,000 to 26,000.

Example 1

A polymer blend of 90% by weight of polyvinyl alcohol and 10% by weight of poly sodium styrene sulfonate was prepared. The two components were premixed and then pelletized. The composition was formed into a film by means of a blown film process at 200° C.

Example 2

A polymer blend of 80% by weight of polyvinyl alcohol and 20% by weight of poly sodium styrene sulfonate was prepared. The two components were premixed and then pelletized. The composition was formed into a film by means of a blown film process at 200° C.

Example 3

A polymer blend of 70% by weight of polyvinyl alcohol and 30% by weight of poly sodium styrene sulfonate was prepared. The two components were premixed and then pelletized. The composition was formed into a film by a blown film process at 200° C.

Example 4

For comparative purposes a film was made without a sulfonate polymer. A film was cast from an aqueous polyvinyl alcohol solution, the concentration and the average MW of which are 18 wt % and 7,000-13,000, respectively. The solution was poured onto a glass plate and is spread into a uniform film by a glass bar. It was dried for 24 hours at a temperature of 45° C. The dried film was peeled off from the glass plate.

The water solubility rates of the films produced in Examples 1 to 4 were measured. Films of 4 cm×1 cm×0.03 cm (thickness) were used. 250 ml of water in a 500 ml beaker was held at 15° C. and constantly stirred. The films were put in the water and permitted to dissolve. The water solubility rate was measured as the time interval between the moment the film touched the water and the moment the film disappeared by visual inspection. The results are summarized in Table 1.

TABLE 1

Controllable Water Solubility Rate of the Films

| | Compositions of the Films (wt %) | | Water Solubility Rate at 15° C. (Sec.) |
|---|---|---|---|
| | A | B | |
| Ex. 1 Film | 90 | 10 | 10.2 |
| Ex. 2 Film | 80 | 20 | 8 |
| Ex. 3 Film | 70 | 30 | 3 |
| Ex. 4 Film | 100 | 0 | 14.2 |

A = Polyvinyl alcohol
B = Poly sodium styrene sulfonate

The water solubility rates of the Example 1 film, Example 2 film and Example 3 film are 1.4, 1.8 and 8 times faster than that of Example 4 film, respectively.

Example 5

A blend of 91% by weight of polyvinyl alcohol and 9% by weight of poly sodium styrene sulfonate was prepared, with 12.6% by weight (based on the total weight of the polymers) of propylene glycol, 1.7% by weight of sodium $C_{12-16}$ olefin sulfonate and 1.7% dihydroxy ethylphenol amine. The components were premixed and then pelletized. The composition was formed into a film by a blown film process at 195° C.

Example 6

For purposes of comparison with the film of Example 5, a film was made without the poly sodium styrene sulfonate. A blend of 100% by weight of polyvinyl alcohol was prepared with 12.6% by weight (based on the total weight of the polyvinyl alcohol) of propylene glycol, 1.7% by weight of sodium $C_{12-16}$ olefin sulfonate and 1.7% by weight of dihydroxy ethyphenol amine. The components were premixed and then pelletized. A film was formed into a film by a blown film process at 198° C.

The water solubility rates of the films produced in Examples 5 and 6 were measured (at 25° C.) by the method described above in Example 4. The results are summarized in Table 2.

TABLE 2

Water Solubility Rate at 25° C.

Film Compositions (wt %)

| | A | B | C | Water Solubility Rate at 25° C. (Sec.) |
|---|---|---|---|---|
| Example 5 | 91 | 9 | 16 | 4 |
| Example 6 | 100 | 0 | 16 | 8.4 |

A = Polyvinyl alcohol
B = Poly sodium styrene sulfonate
C = Propylene glycol 12.6 wt %; sodium $C_{12-16}$ olefin sulfonate 1.7 wt %; and dihydroxy ethylphenol amine 1.7 wt %. Weight percentages are relative to the total weight of the polymers only.

The water solubility rates of the Example 5 film is 2.1 times faster than that of Example 6 film, at 25° C.

The water solubility rates of these films was then measured at 0° C., using the same method. The results are summarized in Table 3.

TABLE 3

Water Solubility Rate at 0° C.

Film Compositions [wt %]

| | A | B | C | Water Solubility Rate at 0° C. [Sec.] |
|---|---|---|---|---|
| Example 5 | 91 | 9 | 16 | 9.4 |
| Example 6 | 100 | — | 16 | 22.4 |

A = Polyvinyl alcohol
B = Poly sodium styrene sulfonate
C = Propylene glycol 12.6 wt %; sodium $C_{12-16}$ olefin sulfonate 1.7 wt %; and dihydroxy ethylphenol amine 1.7 wt %. Weight percentages are relative to the total weight of the polymers only.

The water solubility rates of the Example 5 film is 2.4 times faster than that of the Example 6 film, at 0° C.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A water-soluble film comprising a blend of polyvinyl alcohol and a water-soluble sulfonate polymer, said film having a selected water-solubility rate, said sulfonate polymer being present in said blend in a selected weight percent of said blend, said selected water solubility rate being dependent on said selected weight percent of said sulfonate polymer, said sulfonate polymer having a number average molecular weight in the range of 18,000 to 26,000, said polyvinyl alcohol having a number average molecular weight in the range of 7,000 to 13,000.

2. A film according to claim 1 wherein said sulfonate polymer contains a sulfo group in the form of —$SO_3M$ wherein M is hydrogen, sodium, potassium or ammonium.

3. A film according to claim 2 wherein said blend contains 0.01 to 60 weight percent of said sulfonate polymer.

4. A film according to claim 2 wherein said blend contains 0.1 to 50 weight percent of said sulfonate polymer.

5. A film according to claim 2 wherein said blend contains 1 to 40 weight percent of said sulfonate polymer.

6. A film according to claim 2 wherein said sulfonate polymer is a homopolymer or a co-polymer formed by free-radical polymerization of sulfonate monomers.

7. A film according to claim 6 wherein said sulfonate monomer is derived from one of 2-chloroethylene sulfonic acid, ethylenesulfonic acid, ethylenedisulfonic acid, 1-nitriloethylenesulfonic acid, 2-formylethylenesulfonic acid, 1-carboxyethylenesulfonic acid, 1-propene-1-sulfonic acid, 1-propene-2-sulfonic acid, 2-formyl-1-methylethylene sulfonic acid, 1-carboxy-2-methylethylene sulfonic acid, 2-methyl-1,3-propenedisulfonic acid, 1-butene-1-sulfonic acid, 1-carboxy-2,2-dimethyl-ethylene sulfonic acid, 1-pentene-1-sulfonic acid, 1-hexene-1-sulfonic acid, 2-(p-nitrophenyl) ethylene sulfonic acid, 2-phenylethylene sulfonic acid, 2-(p-hydroxyphenyl)ethylene sulfonic acid, 2-(2-aminophenyl) ethylene sulfonic acid, 1-methyl-2-phenylethylene sulfonic acid, 2-(p-methoxyphenyl)ethylene sulfonic acid, 4-phenyl-1,3-butadiene sulfonic acid, 2-(p-acetamidophenyl)ethylene sulfonic acid, 3-chloroallyl solfonic acid, allyl sulfonic acid, 1-hydroxyallyl sulfonic acid, 2-cynoallyl sulfonic acid, 3-chloromethallyl sulfonic acid, 1-carboxyallyl sulfonic acid, 3-carboxyallyl sulfonic acid, methallyl sulfonic acid, 2-methylene-4,4-dimethyl-1,3-disulfo-pentene, 4-methylene-4,4-dimethyl pentene sulfonic acid, 1-hydroxy-3-phenylallyl sulfonic acid, 3-phenylallyl sulfonic acid, 2-benzylallyl sulfonic acid, 2-(p-methylphenoxy) allyl-sulfonic acid, 3-phenoxymethallyl sulfonic acid, 2-sulfoethyl acrylate, 2-sulfoethyl maleate, 3-sulfopropyl acrylate, 2-sulfonyl methacrylate, 3-sulfopropyl acrylate, 2-sulfo-1-(sulfomethyl)ethyl methacrylate, 3-sulfopropyl maleate, 4-sulfobutyl methacrylate, 2-(acyloxymethyl)-c-sulfuran, bis-2-sulfoethyl fumarate, 3-sulfopropyl itaconate, p-sulfophenyl acrylate, 2-(2-methylacryloxymethyl)-sulfofuran, bis(2-sulfoethyl) itaconate, p-sulfophenyl methacrylate, bis(3-sulfopropyl) maleate, bis(3-sulfopropyl) fumarate, bis(2-sulfopropyl) maleate, bis(2-sulfopropyl) fumarate, 5-methyl-2-(methallyloxy)benzene sulfonic acid, bis(2-sulfopropyl) itaconate, ar-(2-acryloyloxyethoxy)-2-naphthalene sulfonic acid, ar-(2-methacryloyloxyethoxy)-naphthalene sulfonic acid, dodecyl-4-sulfopropyl itaconate, dodecyl-4-sulfobutyl itaconate, n-acryloyl taurine, allylthioethyl sulfonic acid, alloxy propene sulfonic acid, n-allyl-n-methylaminoethane-sulfonic acid, n-(methacrylamidomethyl)-sulfoacetamide, vinyloxybenzene sulfonic acid, n-(p-sulfophenyl)methacrylamide, p-[(2-vinylsulfonyl)ethoxy]-benzene sulfonic acid, n-methyl-n-(2-vinylsulfonyl-ethyl)-p-(sodiumsulfo) benzyl amine, dichlorostyrene sulfonic acid, 2-chlorostyrene sulfonic acid, p-styrene sulfonic acid, p-sulfonic acid, vinyltoluene sulfonic acid, 2-methyl styrene sulfonic acid, the potassium, sodium and ammonium salts of each of the foregoing compounds, 4-methylene-2,2,6,6-tetramethyl-3,5-disulfoheptene, allyloxyethyl sulfonic acid, allyl oxybenzene sulfonic acid, and styrene sulfonic acid.

8. A film according to claim 2 wherein said sulfonate polymer is made by condensation polymerization of formaldehyde with sulfonate monomers.

9. A film according to claim 8 wherein said sulfonate monomers are derived from one or more of aminophenol sulfonic acid, 2-amino-4-chloro-phenyl sulfonic acid, 2-amino-1-naphalene sulfonic acid, 1-amino-8-naphthol-3,5 disulfonic acid, amino-naphalene trisulfonic acid, aminobenzene-2,5 disulfonic acid, diaminostilbene sulfonic acid, phenol sulfonic acid, amino-naphthol disulfonic acid, and aminodiphenylamine methane sulfonic acid.

10. A film according to claim 2 wherein said sulfonate polymer includes sodium sulfonic styrene.

11. A film according to claim 2 wherein said sulfonate polymer is one of sulfonated polystyrene, sulfonated polysulfone, sulfonated melamine-formaldehyde resin, sulfonated phenol-formaldehyde resin, sulfonated urea-formaldehyde resin, sulfonated naphthalene-formaldehyde resin, sulfonated ethyl cellulose, sulfonated polyurethane, sulfonated polypropylene glycol, and sulfonated polyethylene glycol.

12. A film according to claim 2 wherein said blend includes a film-forming additive.

13. A film according to claim 12 wherein said additive is present in the range of 0.1-18% by weight.

14. A film according to claim 12 wherein said additive is a wetting agent, filler, plasticizer, antioxidant, mold-releasing agent, biocide, anti-blocking agent, defoamer or lubricant.

15. A container made from the film of claim 2.

* * * * *